(No Model.) 2 Sheets—Sheet 1.
J. G. BAKER.
CHERRY STONER.
No. 276,331. Patented Apr. 24, 1883.
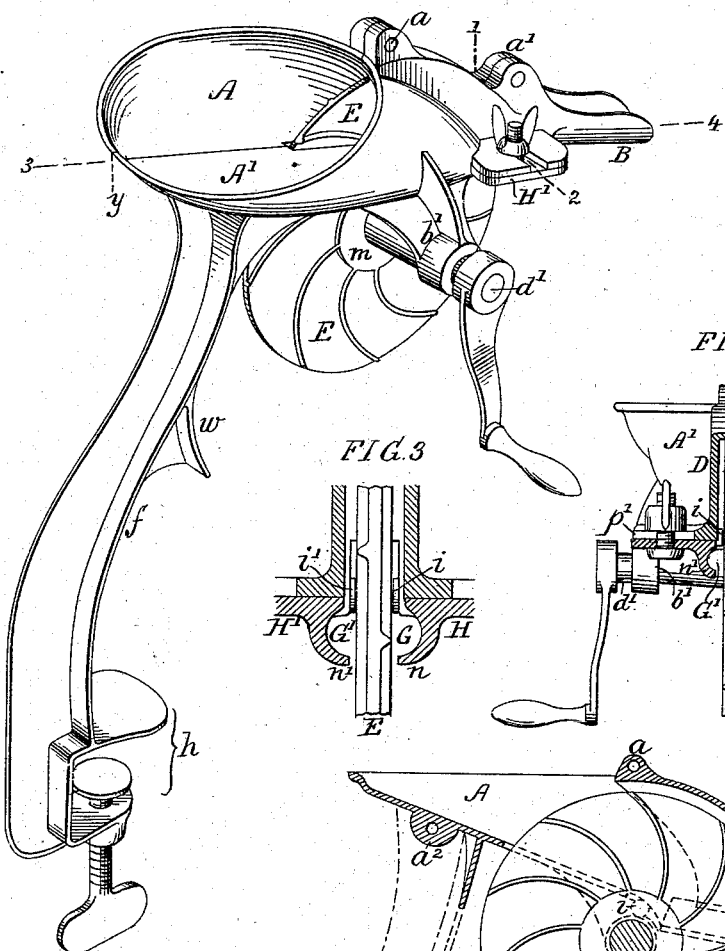
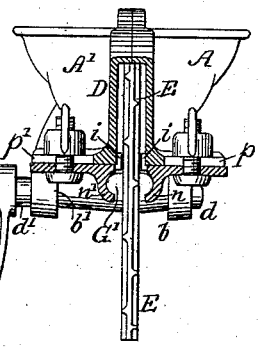
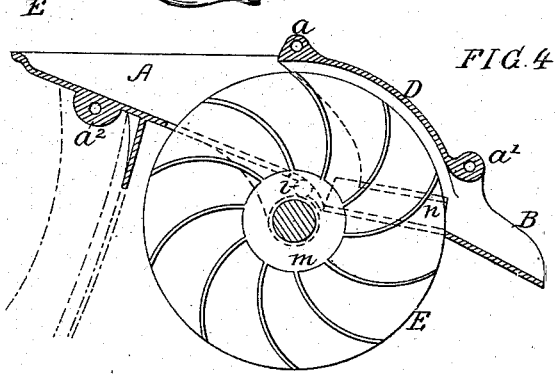
WITNESSES:
Harry Drury
Hamilton D. Turner.
INVENTOR
John G. Baker
By his Attorneys
Howsm and Imp

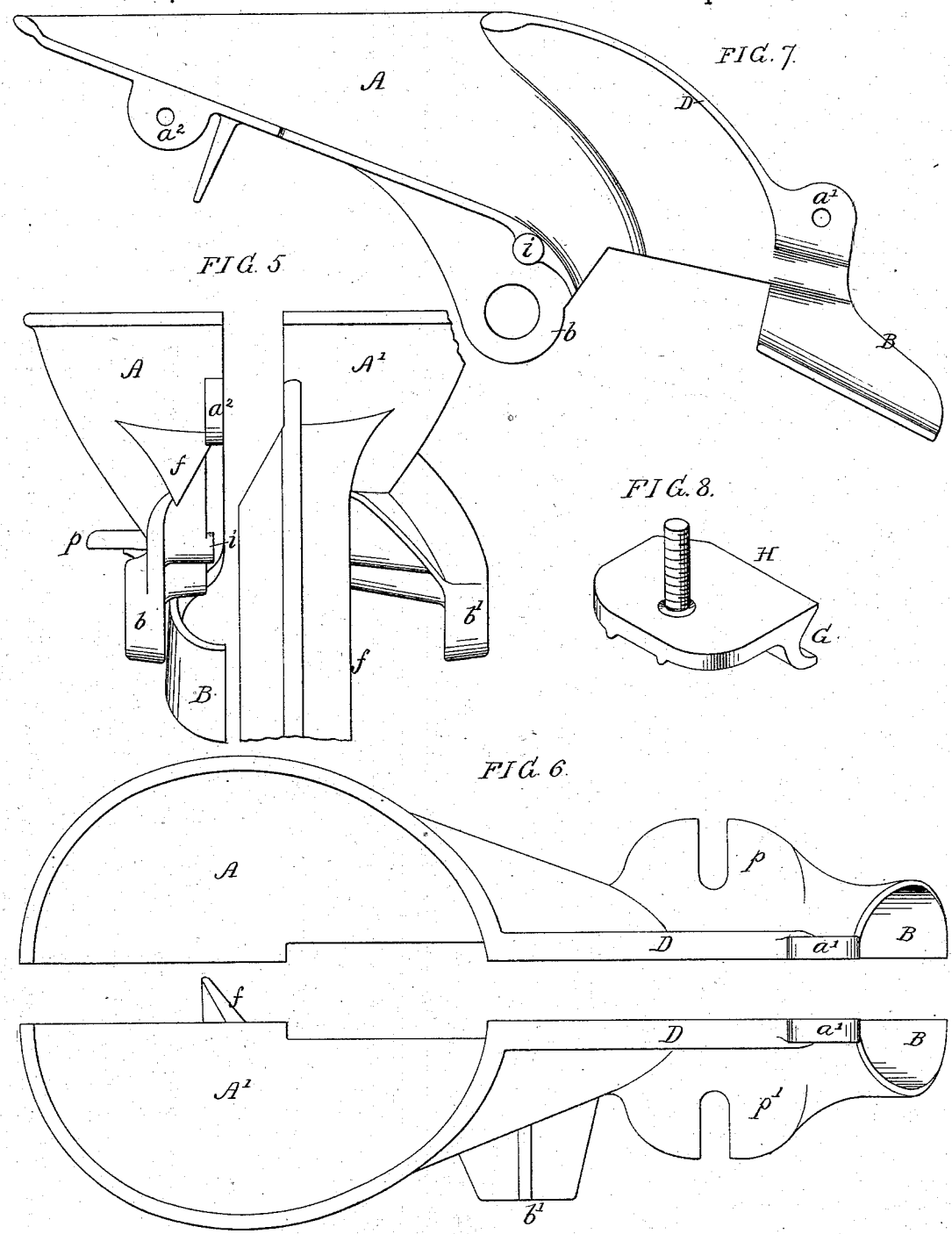

UNITED STATES PATENT OFFICE.

JOHN G. BAKER, OF PHILADELPHIA, PENNSYLVANIA, ASSIGNOR TO THE ENTERPRISE MANUFACTURING COMPANY, OF SAME PLACE.

CHERRY-STONER.

SPECIFICATION forming part of Letters Patent No. 276,331, dated April 24, 1883.

Application filed March 5, 1883. (No model.)

*To all whom it may concern:*

Be it known that I, JOHN G. BAKER, a citizen of the United States, and a resident of Philadelphia, Pennsylvania, have invented certain new and useful Improvements in Cherry-Stoners, of which the following is a specification.

My invention consists of certain improvements, fully described hereinafter, on the machine described in Letters Patent No. 40,604, granted to H. Buckwalter, November 17, 1863, the objects of my improvements being economy and simplicity in construction, the ready adjustment of the machine for stoning cherries of different sizes, and the prevention of the dispersal of the juices.

In the accompanying drawings, Figure 1, Sheet 1, is a general perspective view of my improved cherry-stoning machine; Fig. 2, a transverse section on the line 1 2, Fig. 1; Fig. 3, an enlarged view of part of Fig. 2; Fig. 4, a section on the line 3 4, Fig. 1; Fig. 5, Sheet 2, a rear view of the hopper, showing the two parts detached from each other; Fig. 6, a plan view, showing two parts of the hopper detached from each other; Fig. 7, a view showing the inner side of one part of the hopper and its connections, and Fig. 8 a perspective of one of the stripper-plates.

The hopper consists of two parts, A A', both parts being continued to form the spout B, the shield D, and the throat between the hopper and spout, within which throat (shown in Figs. 2 and 3) is contained part of the wheel E, said wheel having curved ribs on each side and being rotated by a suitable handle. The two parts of the hopper are screwed or riveted together at $a$, $a'$, and $a^2$.

The wheel E has two journals, $d$ $d'$, the former being adapted to a bearing, $b$, on one part, A, of the hopper, and the other journal, $d'$, having the bearing in a projection, $b'$, on the other part, A', of the hopper, as shown in Figs. 1 and 2.

The manner in which the two parts of the hopper are put together and in which one part is combined with the support or stand of the machine will be best understood by reference to Figs. 1 and 5.

The stand $f$ is cast on the portion A' of the hopper, and the portion A is fitted to the upper part of the stand and to the said portion A' in the manner shown, so that, when the two parts are riveted or screwed together at the points indicated above, the hopper and its adjuncts, together with the stand, will be complete.

The lower end of the stand consists of a clamping device, $h$, so that it can be readily secured to the edge of a table, and the stand is curved, so that the operating part of the machine may overhang a vessel placed on the table for receiving the pulp of the cherry.

The above-described mode of construction is economical, as the castings can be readily made without cores, and, further, because it affords the means for the ready application of the wheel to its place and the journals of the wheel to their bearings, for it should be understood that these journals are cast on the wheel, and are introduced into the bearings on putting the two parts of the hopper together.

It may be remarked here that the wheel is maintained in its proper lateral position within the throat of the hopper by small projections $i$ $i$, one on one part and the other on the other part of the hopper, Figs. 2, 3, and 7, the plain central portion, $m$, Fig. 4, of the wheel being situated between said projections, which are far enough apart to permit the wheel to revolve freely, but close enough together to maintain it in the desired lateral position. The position of the projections in respect to the plain portion of the wheel is indicated by the dotted circle in Fig. 4.

It will be seen that by this arrangement and construction of parts the necessity of resorting to pins and collars to prevent the end-play of the journals is obviated.

The action of the machine on the fruit is substantially the same as in that described in the said patent of Buckwalter, the cherries introduced into the hopper being so acted on by the wheel that the curved ribs of the latter disintegrate the pulp and direct the stones to the spout, the pulp falling into a vessel below the machine.

The hopper has in reality two throats separated from each other by the wheel E, as best observed in the enlarged view, Fig. 3, one throat, G, between the lip n and wheel, and the other between the latter and the lip n', cherries being directed by the ribs of the wheel through both throats, within which disintegration takes place.

The stones of some kinds of cherries are larger than those of others, and hence it is essential that the throats should be enlarged for large stones and contracted for the smaller stones. This was accomplished in the Buckwalter machine by the adjustment of the two parts of the entire hopper, so that a longitudinal slot presented itself between the two parts when adjusted for large stones, and the juices escaped through this slot and were scattered about. I obviate this difficulty by permanently securing the two parts of the hopper together, and by using throat-pieces H H', Fig. 8, which are secured by bolts and thumb-nuts, one piece to a flange, p, on one part of the hopper, and the other piece to a similar flange, p', on the other part of the hopper, so that either piece can be adjusted from or toward the wheel and the throats expanded or contracted, as the size of the cherry-stones may suggest.

The position of the throat-pieces is indicated by dotted lines in Fig. 4.

The lower end of the stand may be constructed for attachment to a table by means other than the clamping device, the curved shape of the stand being retained for reasons above given.

More or less of the juice will be forced against this stand by the action of the wheel, and would flow down the stand and onto the table, and thence onto the floor, but for a projection, w, Fig. 1, which extends so far from the stand that the juice will drop from it into the vessel which receives the pulp.

I claim as my invention—

1. The combination of the hopper of a cherry-stoner and its spout, throat, and wheel with the curved stand or support f, substantially as described.

2. The combination of the hopper, spout, throat, and wheel with a curved stand having a projection, w, substantially as set forth.

3. The combination of the hopper, made in two parts, A A', with the stand or support f, cast on one of the said parts, substantially as set forth.

4. The combination of the hopper, made in two parts, A A', each having a projection, i, with the ribbed wheel E, having journals adapted to bearings on the hopper, and having a plain central portion, m, confined between the said projections, all substantially as specified.

5. The combination of the hopper and the ribbed wheel with the adjustable throat-pieces H H', substantially as specified.

In testimony whereof I have signed my name to this specification in the presence of two subscribing witnesses.

JOHN G. BAKER.

Witnesses:
HARRY L. ASHENFELTER,
HARRY SMITH.